(12) United States Patent
Nammi

(10) Patent No.: US 9,401,751 B2
(45) Date of Patent: *Jul. 26, 2016

(54) METHOD AND APPARATUS FOR TRANSMITTING DEMODULATION PILOTS IN A MULTI ANTENNA WIRELESS COMMUNICATION SYSTEM

(71) Applicant: TELEFONAKTIEBOLAGET L M ERICSSON (PUBL), Stockholm (SE)

(72) Inventor: Sairamesh Nammi, Stockholm (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 11 days.

This patent is subject to a terminal disclaimer.

(21) Appl. No.: 14/003,456

(22) PCT Filed: May 8, 2013

(86) PCT No.: PCT/SE2013/050525
§ 371 (c)(1),
(2) Date: Sep. 6, 2013

(87) PCT Pub. No.: WO2013/169201
PCT Pub. Date: Nov. 14, 2013

(65) Prior Publication Data
US 2014/0079148 A1    Mar. 20, 2014

Related U.S. Application Data

(60) Provisional application No. 61/646,066, filed on May 11, 2012.

(51) Int. Cl.
*H04L 27/00*    (2006.01)
*H04B 7/04*    (2006.01)
(Continued)

(52) U.S. Cl.
CPC ............ *H04B 7/0473* (2013.01); *H04B 7/0413* (2013.01); *H04B 7/0417* (2013.01);
(Continued)

(58) Field of Classification Search
CPC .............................. H04L 5/0051; H04L 5/005
USPC .................................................. 375/267, 295
See application file for complete search history.

(56) References Cited

U.S. PATENT DOCUMENTS 5,852,630 A * 12/1998 Langberg et al. ............. 375/219
8,891,646 B2 * 11/2014 Nammi et al. ................ 375/260
(Continued)

FOREIGN PATENT DOCUMENTS

EP    2 469 906 A1    6/2012
EP    2 557 712 A1    2/2013
(Continued)

OTHER PUBLICATIONS

Ericsson, "4-branch MIMO for HSDPA" 3GPP TSG RAN WG1 Meeting #65, R1-111763, 2011, 17 pages.
(Continued)

*Primary Examiner* — David S Huang
(74) *Attorney, Agent, or Firm* — Rothwell, Figg, Ernst & Manbeck, P.C.

(57) ABSTRACT

Multiple antennas employed at transmitting and receiving nodes can significantly increase a MIMO system capacity, especially when the geometry of the receiving node is high. The transmitting node can determine geometry by transmitting common pilots (which may include legacy and non-legacy common pilots) and receiving feedback from the receiving node based on the common pilots. The geometry can also be determined through measuring uplink signals from the receiving node. If the geometry is high enough, the transmitting node may transmit demodulation pilot(s) in addition to the common pilots. The demodulation pilot transmission may be concurrent with data transmission. The receiving node can use the demodulation pilot(s) to estimate the channel for demodulating the data received from the transmitting node. The transmitting node may notify the receiving node to monitor for the demodulation pilot(s) through a configuration message sent over a control channel.

21 Claims, 9 Drawing Sheets

(51) Int. Cl.
*H04L 5/00* (2006.01)
*H04L 25/02* (2006.01)

(52) U.S. Cl.
CPC .............. *H04B 7/0421* (2013.01); *H04L 5/005* (2013.01); *H04L 5/0007* (2013.01); *H04L 5/0051* (2013.01); *H04L 25/0204* (2013.01); *H04L 25/0224* (2013.01)

(56) References Cited

U.S. PATENT DOCUMENTS

| | | | |
|---|---|---|---|
| 9,077,417 B2* | 7/2015 | Nammi | H04B 7/0619 |
| 2002/0172293 A1* | 11/2002 | Kuchi et al. | 375/267 |
| 2004/0160921 A1* | 8/2004 | Kaipainen et al. | 370/335 |
| 2005/0180377 A1* | 8/2005 | Muramoto et al. | 370/345 |
| 2006/0062322 A1 | 3/2006 | Namgoong et al. | |
| 2007/0242766 A1 | 10/2007 | Xu et al. | |

FOREIGN PATENT DOCUMENTS

| | | |
|---|---|---|
| WO | 2010145254 A1 | 12/2010 |
| WO | 2011124147 A1 | 10/2011 |

OTHER PUBLICATIONS

Ericsson et al. "Common Pilot Design for Four branch MIMO System" 3GPP TSG RAN WG1 Meeting #68, R1-120352, 2012, 11 pages.

Ericsson, "New WI: Four Branch MIMO transmissions for HSDPA", feature part, core part, performance part, 3GPP TSG-RAN meeting #53, RP-111393, 2011, 16 pages.

Notification of Transmittal of the International Search Report and the Written Opinion of the International Searching Authority, issued in International application No. PCT/SE2013/050525 on Nov. 6, 2013, 11 pages.

* cited by examiner

METHOD AND APPARATUS FOR TRANSMITTING DEMODULATION PILOTS IN A MULTI ANTENNA WIRELESS COMMUNICATION SYSTEM

CROSS REFERENCE TO RELATED APPLICATION(S)

This application is a 35 U.S.C. §371 National Phase Entry Application from PCT/SE2013/050525, filed May 8, 2013, designating the United States, and also claims the benefit of U.S. Provisional Application No. 61/646,066, filed May 11, 2012. The disclosures of both applications are incorporated herein in their entirety by reference. One or more aspects of the subject matter disclosed herein may be related to U.S. Provisional Application 61/646,129, filed May 11, 2012, the entire contents of which is incorporated by reference herein.

TECHNICAL FIELD

The technical field of the present disclosure generally relates to wireless communications. In particular, the technical field of the present disclosure relates to transmission of demodulation pilot signals in a multi-antenna wireless communication system.

BACKGROUND

A MIMO (Multiple Input Multiple Output) system can increase the performance and communication capacity of a wireless communication system. MIMO employs multiple transmission antennas and multiple reception antennas to enhance data transmission and/or reception efficiency, and hence, is also called a multiple antenna system. MIMO techniques include spatial multiplexing, transmit diversity, beamforming, and the like.

In spatial multiplexing, independent symbol streams are transmitted in the same frequency bandwidth on different antennas of a transmitting node such as a base station (e.g., BTS, eNodeB, eNB, etc.) This allows data to be transmitted at high rates without increasing bandwidth of the system. In transmit diversity, the same data is transmitted from transmission antennas. By using space-time codes at the transmitting node, reliability of the detected symbols at a receiving node, e.g., a UE (user equipment) can be improved by exploiting transmit diversity. Beamforming is typically used to increase SINR (signal-to-interference-plus-noise ratio) of a signal by adding weight values according to channel states at multiple antennas. The weight values may be represented by a weight vector or a weight matrix, and is also referred to as a precoding vector or a precoding matrix.

In practical wireless systems such as the 3GPP (3rd Generation Partnership Project) LTE (Long Term evolution), UMTS (Universal Mobile Telecommunications System), HSDPA (High Speed Downlink Packet Access) and WiMAX (Worldwide Interoperability for Microwave Access) systems, knowledge of the channel or channels between the transmitting node and the receiving node is used to enhance performances. The channel knowledge can be made available at the transmitting node via feedback from the receiving node to the transmitting node. A MIMO transmitting node can utilize this channel information to improve the system performance with the aid of precoding. In addition to beam forming gain, the use of precoding avoids the problem of ill-conditioned channel matrix.

In wireless systems such as the ones mentioned above, multiple antennas with precoding and/or beamforming technology can be adopted to provide high data rates to the UEs. In these systems, the base station transmits one or more predetermined signals known in advance by UEs. These known signals are sometimes referred to as pilot signals (e.g., in UMTS) or as reference signals (e.g., in LTE). These pilot signals are inserted at predetermined positions in the OFDM (orthogonal frequency division multiplex) time-frequency grid and allow a UE to estimate the downlink channel so that it may carry out coherent channel demodulation. For ease of description, such known signals are referred to as pilot signals or more succinctly as pilots.

Another MIMO function for the pilots transmitted by the base station is for the UE to detect the pilots, and feed back to the base station an estimate of CSI (Channel State Information) based on the detected pilots. CSI refers to known channel properties of a communication link describing how a signal propagates from the transmitting node to the receiving node and represents the combined effect of, for example, scattering, fading, and power decay with distance. Based on the CSI estimate, the base station can adapt downlink transmissions to current channel conditions, which is important for reliable communication with high data rates in multi-antenna systems. Each MIMO channel between the base station and the UE needs its own CSI estimate.

In practice, complete CSI may be difficult to obtain, e.g., for a FDD (frequency division duplex) system. In such a system, some kind of CSI knowledge may be available at the transmitting node via the feedback from the receiving node. These systems are called limited feedback systems. There are many implementations of limited feedback systems such as codebook based feedback and quantized channel feedback. 3GPP LTE, HSDPA and WiMAX recommend codebook based feedback CSI for precoding.

In a codebook based precoding, predefined codebook is defined both at the transmitting and receiving nodes. Entries of the codebook can be constructed using different methods such as Grassmannian, Lyod algorithm, DFT matrix etc. The precoder matrix is often chosen to match the characteristics of the $N_R \times N_T$ MIMO channel matrix H ($N_R$ being the number of receive antennas at the receiving node and $N_T$ being the number of transmit antennas at the transmitting node), resulting in a so called channel dependent precoding. This is also commonly referred to as closed-loop precoding and essentially strives for focusing the transmit energy into a signal subspace which is strong in the sense of conveying much of the transmitted energy to the UE. The signal subspace in this context is a subspace of a signal space that is defined in any number of dimensions including space, time, frequency, code, etc.)

In addition, the precoder matrix may also be selected to strive for orthogonalizing the channel, meaning that after proper linear equalization at the UE, the inter-layer interference is reduced. At the receiving node, it is common to find SINR with different codebook entries and choose the rank and/or precoding index which gives the highest spectral efficiency (also referred to as channel capacity). In this context, rank indicates the number of data streams that can be simultaneously transmitted from a transmitting node to a receiving node.

The performance of a closed-sloop MIMO system generally improves with the cardinality (size) of the codebook set. At the receiving node, RI (rank information) and PCI (precoding control index) are sent back to the transmitting node every TTI (transmission time interval) or multiples of TTI (for example 5 in LTE, ⅓ in HSDPA).

Existing UMTS, LTE, and other systems (e.g., WiMax, 802.11(n), etc.) support up to 2×2 MIMO transmissions (max $N_R=2$, max $N_T=2$) which means that the base station must obtain two channel pilots to estimate or characterize each of the two spatial layers. In order to support 4×4 MIMO transmissions, the base station must obtain four channel pilots in order to estimate or characterize each of the four spatial layers. As compared to existing or legacy LTE systems, two new pilots must be defined to perform the channel demodulation and CSI estimation for the two new MIMO channels.

Pilots enable two main functionalities—CSI estimation through channel sounding where rank, CQI (channel quality information) and PCI are estimated and channel estimation for demodulation purposes. For a 4-branch MIMO (also referred to as 4Tx MIMO), the eNodeB may transmit four common pilots. In the context of this document, "common" pilots refer to pilot signals that are made available to all UEs and which are transmitted without UE specific beam forming.

Common pilots may be transmitted at instances in which legacy (e.g., 2×2 MIMO) UEs (Release 7 MIMO and Release 99) that are not able to demodulate the 4Tx transmissions, are scheduled. These legacy UEs cannot make use of the energy in the $3^{rd}$ and $4^{th}$ common pilots. Also the energy made available in the $3^{rd}$ and $4^{th}$ common pilots reduces the amount of energy available for HS-PDSCH (High Speed Physical Downlink Shared Channel) scheduling to the legacy UEs. Moreover, the $3^{rd}$ and $4^{th}$ common pilots can cause interference to these legacy UEs which at best can make use of the $1^{st}$ and $2^{nd}$ common pilots. Therefore, to minimize performance impacts to non-legacy (4Tx) UEs, it is desirable that the power of at least the $3^{rd}$ and $4^{th}$ common pilots be reduced to a low value. However, reducing the powers of the $3^{rd}$ and $4^{th}$ common pilots can negatively impact the performances of the non-legacy UEs.

SUMMARY

A non-limiting aspect of the disclosed subject matter is directed to a method performed by a transmitting node of a wireless communication system. The transmitting node may be capable of multi-antenna transmission. The method that the transmitting node performs may include transmitting data to a receiving node; transmitting a plurality of common pilot signals to the receiving node; and transmitting one or more demodulation pilot signals to the receiving node. Each common pilot signal may be transmitted using one antenna of the transmitting node in which no antenna is used to transmit more than one common pilot signal. Each demodulation pilot signal may also be transmitted using one antenna of the transmitting node in which no antenna is used to transmit more than one demodulation pilot signal.

Another non-limiting aspect of the disclosed subject matter is directed to a computer-readable medium which includes therein programming instructions. When a computer executes the programming instructions, the computer executes the method performed in a transmitting node to perform multi-antenna transmission as described above.

Another non-limiting aspect of the disclosed subject matter is directed to a transmitting node of a wireless communication system. The transmitting node may be capable of multi-antenna transmission, and may comprise a communicator and a pilot provider. The communicator may be structured to transmit data to a receiving node. The pilot provider may be structured to transmit a plurality of common pilot signals to the receiving node such that each common pilot signal is transmitted from one antenna of the transmitting node in which no antenna is used to transmit more than one common pilot signal. The pilot provider may also be structured to transmit one or more demodulation pilot signals to the receiving node such that each demodulation pilot signal is transmitted using one antenna of the transmitting node in which no antenna is used to transmit more than one demodulation pilot signal.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

DETAILED DESCRIPTION

Figure 1:
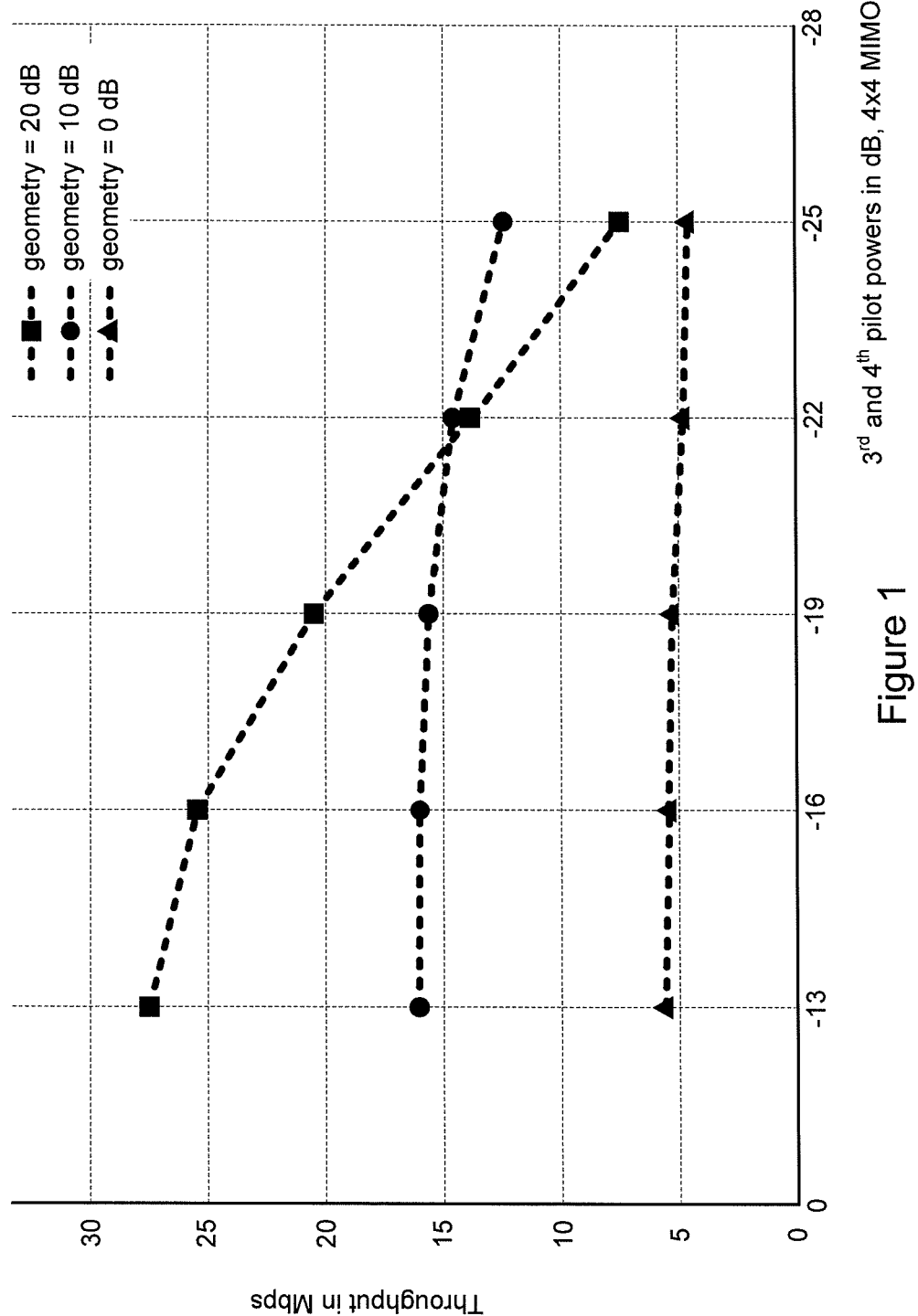
FIGS. 1 and 2 graphically illustrate link level performances of 4×4 and 4×2 MIMO capable UEs, respectively, when different pilot powers are used for different pilot signals.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed.

Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer should be generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

A cell is associated with a base station, where a base station comprises in a general sense any node transmitting radio signals in the downlink (DL) and/or receiving radio signals in the uplink (UL). As mentioned above, example base stations are a NodeB, eNodeB, eNB, macro/micro/pico radio base station, home eNodeB, relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Although the description is given for UEs, it should be understood by the skilled in the art that "UE" is a non-limiting term comprising any wireless device or node equipped with a radio interface allowing for at least one of: transmitting signals in UL and receiving and/or measuring signals in DL. Some examples of UE in its general sense are PDA, laptop, mobile, sensor, fixed relay, mobile relay, a radio network node (e.g., an LMU or a femto base station or a small base station using the terminal technology). A UE herein may comprise a UE (in its general sense) capable of operating or at least performing measurements in one or more frequencies, carrier frequencies, component carriers or frequency bands. It may be a "UE" operating in single-RAT or multi-RAT or multi-standard mode (e.g., an example dual-mode UE may operate with any one or combination of WiFi and LTE).

The signaling described may either be via direct links or logical links (e.g. via higher layer protocols and/or via one or more network nodes). For example, signaling from a coordinating node may pass another network node, e.g., a radio node. Embodiments described herein may be considered as independent embodiments or may be considered in any combination with each other to describe non-limiting examples.

In this document, 3GPP terminologies—e.g., HSDPA, WCDMA, LTE, LTE-A—are used as examples for explanation purposes. Note that the technology described herein can be applied to non-3GPP standards, e.g., WiMAX, UMB, GSM, cdma2000, 1×EVDO, Wireless LAN, WiFi, etc. Thus, the scope of this disclosure is not limited to the set of 3GPP wireless network systems and can encompass many domains of wireless communication systems. Also, a wireless terminal (e.g., UE, laptop, PDA, smart phone, mobile terminal, etc.) will be used as an example of a receiving node in which the described method can be performed. That is, the descriptions generally will focus on the downlink transmissions. However, the subject matter is equally applicable to uplink transmissions. That is, the disclosed subject matter is applicable to any node of the network including base stations (e.g., RBS, NodeB, eNodeB, eNB, etc.) and relay stations that receive wireless signals.

As indicated above, many existing systems support at most up to 2×2 MIMO transmissions (referred to as "legacy" for convenience). To support legacy apparatuses, two common pilots—$1^{st}$ and $2^{nd}$—are defined. To support 4×4 MIMO transmissions (referred to as "non-legacy" for convenience), two new pilots—$3^{rd}$ and $4^{th}$ pilot signals—are defined to perform the channel demodulation and CSI estimation for the additional MIMO channels. The $3^{rd}$ and $4^{th}$ pilot signals are also common in that the signals are made available to all UEs.

Before proceeding further, it should be noted that terms "legacy" and "non-legacy" should not be taken to be limited to refer to 2×2 and 4×4 MIMO only. Rather, the terms should be taken in a relative sense. For example, a 4×4 MIMO apparatus would be a legacy apparatus relative to an 8×8 MIMO apparatus. In this instance, an 8×8 MIMO transmitting node may transmit eight common pilots—four of which may be understood by a 4×4 MIMO receiving node and four that may not be understood. Thus, one differentiation (there can be several) between legacy and non-legacy apparatuses is that all of the common pilots known by the legacy apparatus are also known by the non-legacy apparatus. However, the reverse is not true, i.e., there is at least one common pilot known by the non-legacy apparatus but not known by the legacy apparatus. It should be clear that the described concepts are applicable to circumstances in which there are apparatuses with levels of MIMO capabilities other than 2×2 or 4×4.

However, for purposes of explanation, 2×2 and 4×4 MIMO examples will be used in the description below, and they will be respectively referred to as "legacy" and "non-legacy" for convenience. As mentioned, to the legacy UEs, the $3^{rd}$ and $4^{th}$ common pilots are undesirable. First, the energy made available in the $3^{rd}$ and $4^{th}$ common pilots reduces the amount of energy available for HS-PDSCH scheduling to the legacy UEs. Second, the $3^{rd}$ and $4^{th}$ common pilots can cause interference to the legacy UEs which at best can make use of the $1^{st}$ and $2^{nd}$ common pilots. Therefore, to minimize performance impacts to the legacy UEs, it is desirable that the power of the $3^{rd}$ and $4^{th}$ common pilots be reduced. Hence, the $1^{st}$ and $2^{nd}$ common pilots may be transmitted at relative high powers (e.g., −10 dB, −13 dB, respectively) and the $3^{rd}$ and $4^{th}$ common pilots may be transmitted at relatively low powers (e.g., −22 dB).

Figure 2:

However, if the powers of the $3^{rd}$ and $4^{th}$ common pilots are minimal, then the demodulation performance of the non-legacy UEs can be adversely impacted. This is demonstrated in FIGS. 1 and 2. FIG. 1 illustrates an example of link level throughputs as a function of pilot powers on $3^{rd}$ and $4^{th}$ pilot signals for a non-legacy UE with three different geometries for a 4×4 MIMO system. FIG. 2 illustrates an example of link level throughputs also as a function of pilot powers on $3^{rd}$ and $4^{th}$ pilot signals, but for a 4×2 MIMO system. In both figures, higher geometry such as 20 dB indicates that the environment the UE is in is relatively clean (high CIR (carrier-to-interference ratio), high SINR, high SNR, etc.) and lower geometry such as 0 dB indicates that the UE is in an environment that is relatively dirty or noisy. In these figures, the pilot powers for the $1^{st}$ and $2^{nd}$ pilot signals are assumed to be maintained at −10 and −13 dB, respectively.

It can be observed that as the $3^{rd}$ and $4^{th}$ pilot powers are reduced, the performance of the non-legacy UE degrades. The degradation is severe at high geometries (e.g., at 20 dB). This is because at high geometries, there is a high probability of rank 3 and rank 4 transmissions and/or high data rates, which require a larger amount of pilot power energy. On the other hand, low data rates and/or rank selections (e.g., ranks 1 and 2), which occur at low geometries (e.g., 0 dB) can be demodulated with a lower amount of pilot energy.

Typically, each common pilot signal is transmitted on a corresponding antenna or antenna port of the transmitting node. For ease of description and brevity, "antenna" will be used. Thus, a 4Tx transmitting node can transmit $1^{st}$, $2^{nd}$, $3^{rd}$ and $4^{th}$ common pilot signals on corresponding first, second, third and fourth antennas. If the $3^{rd}$ and $4^{th}$ common pilots signals are maintained at low powers to minimize negative impact to the legacy UEs, implication is that the pilot powers transmitted from the third and fourth antennas will be low.

As seen in FIGS. 1 and 2, when a non-legacy UE is to demodulate low data rates and/or low rank, increasing the $3^{rd}$ and $4^{th}$ pilot powers has negligible effect on performance. Thus, keeping the pilot powers of the third and fourth antennas low may acceptable. Indeed, low third and fourth antenna pilot powers may actually be preferable in that negative impact on legacy UEs is minimized.

But also as seen in FIGS. 1 and 2, when the non-legacy UE is to demodulate high data rates with high rank, increasing the $3^{rd}$ and $4^{th}$ pilot powers has significant positive effect on performance. In this instance, it would be desirable to increase the pilot powers transmitted from the third and/or fourth antennas.

In one or more aspects of the disclosed subject matter, it is proposed that a transmitting node increase/decrease the pilot powers of the antennas when high pilot powers are advantageous/disadvantageous. In an embodiment, the transmitting node (e.g., a radio network node) may determine a geometry of a receiving node (e.g., a wireless terminal). If the geometry is high, the transmitting node can transmit both common and demodulation pilot signals. One effect of the demodulation pilot signals is to increase the pilot powers of the antennas.

The common and demodulation pilots can be used by the receiving node to estimate channels between the transmitting node and the receiving node for data demodulation. If the geometry is low, the transmitting node can withhold the demodulation pilots and transmit only the common pilots, and the receiving node can estimate the channels for demodulation based on the common pilots only.

When there are multiple wireless terminals, i.e., receiving nodes, in a cell, the transmitting node can determine the geometries of a plurality of receiving nodes in the cell, and can decide to transmit both the common and demodulation pilots or to transmit the common pilots only based on the multiple geometries. It is possible that the geometries of all receiving nodes in the cell may be determined. But this is not a requirement—the geometries of a subset (not necessarily all) of receiving nodes may be determined. For example, geometries of receiving nodes scheduled to receive data in a particular time frame (e.g., TTI) may be determined.

Recall that the pilot signals enable two main functionalities—CSI estimation through channel sounding and channel estimation for demodulation. Pilot design schemes (e.g., for a 4-branch MIMO) can be divided into:

Common pilots for CSI estimation and for data demodulation;

Common pilots for CSI estimation and demodulation pilots for data demodulation.

Figure 3:
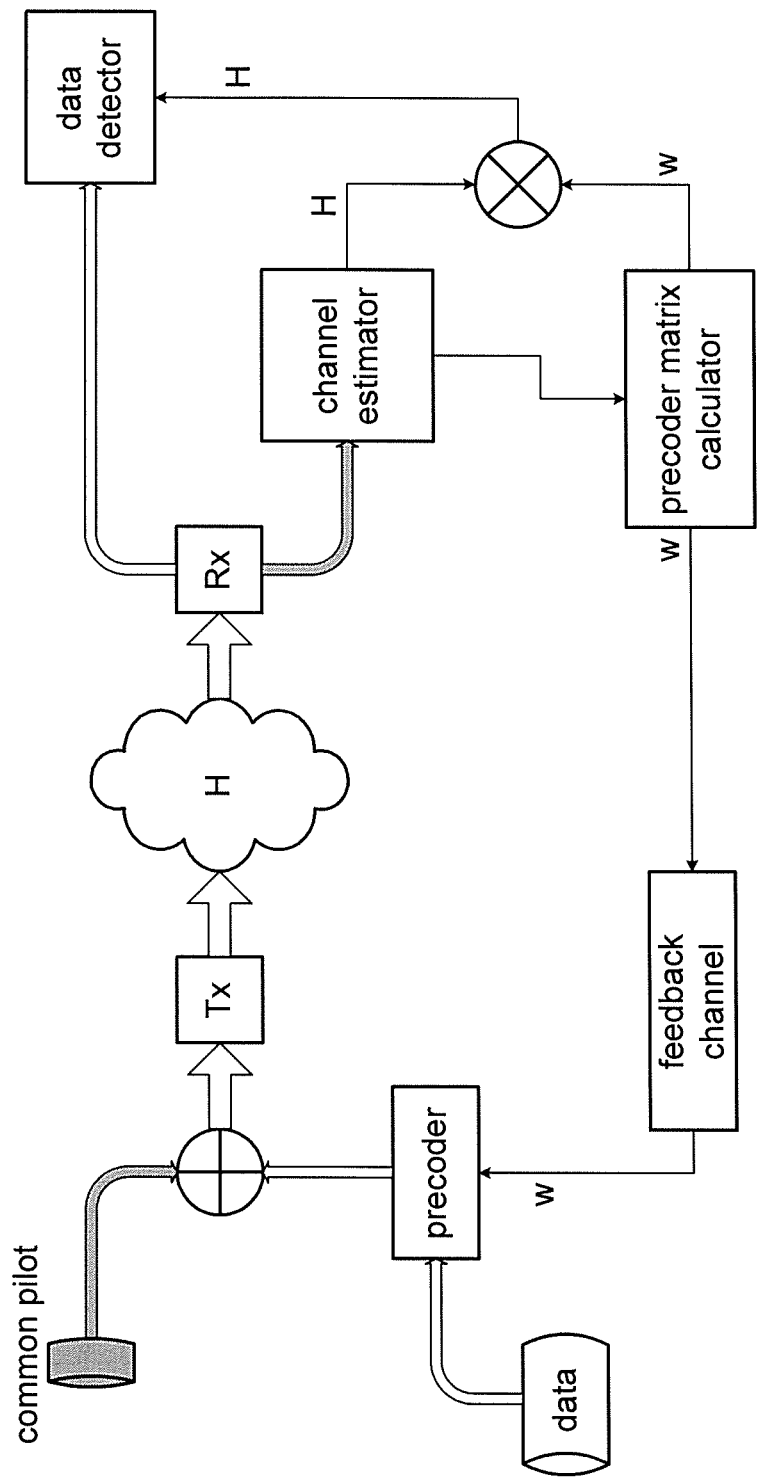
FIG. 3 illustrates a conceptual diagram of an example common pilot design system.
Figure 4:
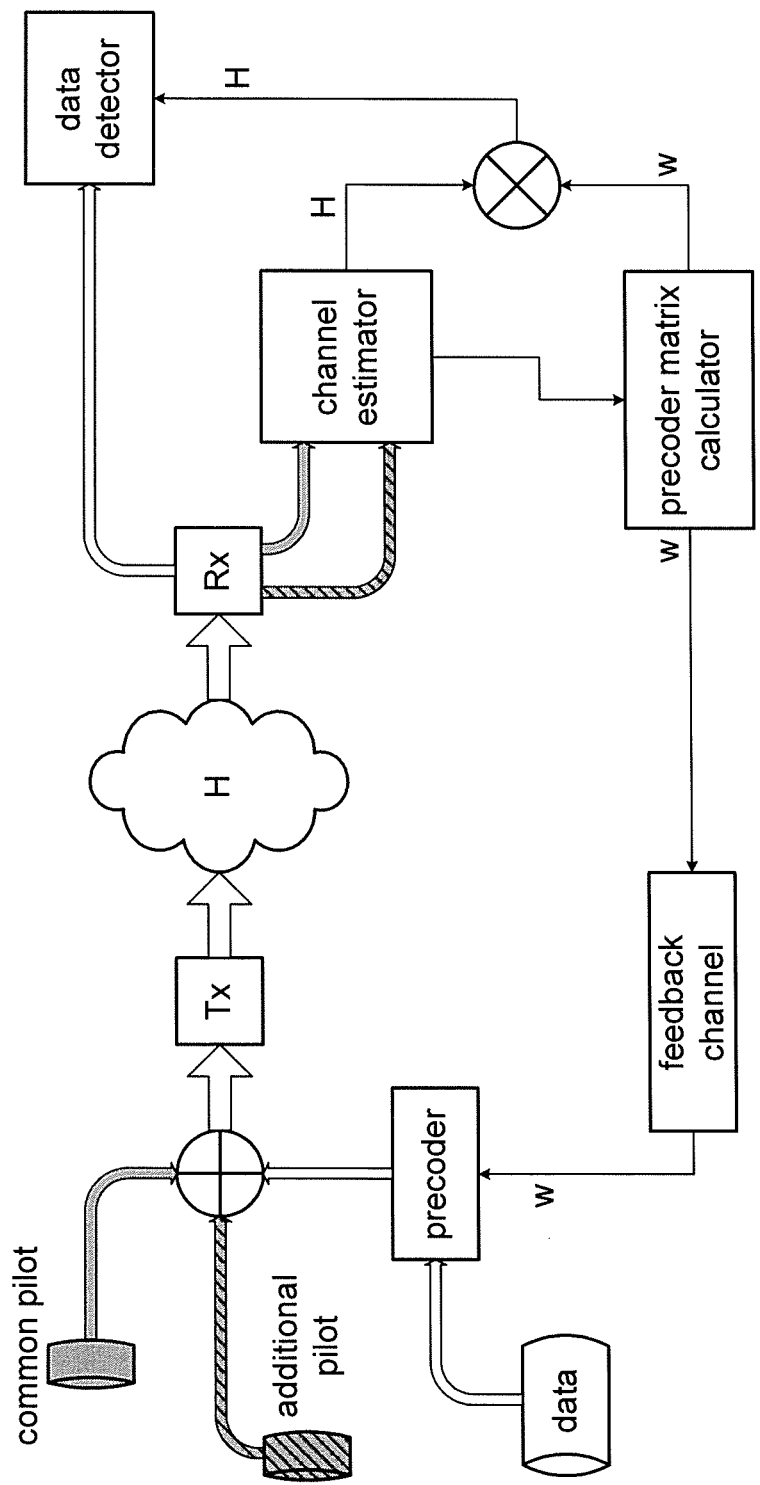
FIG. 4 illustrates a conceptual diagram of an example common and demodulation pilot design system.

FIG. 3 illustrates a conceptual diagram of an example common pilot design system and FIG. 4 illustrates a conceptual diagram of an example common and demodulation pilot design system. In both figures, the transmitter Tx is assumed to be a transmitter of a radio network node (e.g., radio base station (RBS), eNB, eNodeB, NodeB, relay station, micro/femto/pico base station, etc.) and the receiver Rx is assumed to be a receiver of a wireless terminal (e.g., mobile terminal, UE, etc.). While the scenarios of FIGS. 3 and 4 are assumed to be those of downlink transmissions, it should be noted some or all of the described concepts may be applicable to uplink transmissions. Indeed, they may also be applicable to transmissions between peer nodes.

As seen in FIGS. 3 and 4, the radio network node may transmit known pilot symbols—common pilot symbols—for channel estimation and for channel sounding. For example, assuming that the radio network node is a 4×4 MIMO transmitting node, the transmitter Tx may transmit $1^{st}$, $2^{nd}$, $3^{rd}$ and $4^{th}$ common pilot symbols respectively from first, second, third and fourth antennas. In an embodiment, the transmission of the $3^{rd}$ and $4^{th}$ common pilot symbols may be at lower powers relative to the transmissions of the $1^{st}$ and $2^{nd}$ common pilot symbols.

The wireless terminal may estimate a channel quality (typically SINR) from the channel sounding, and may estimate the CSI including preferred precoding matrix and CQI for the next downlink transmission. The wireless terminal may convey the CSI estimation to the radio network node through a feedback channel.

The radio network node may process the feedback information from the wireless terminal, and determine the precoding matrix, modulation, coding rate, rank indication, and other parameters such as transport block size, and so on. The radio network node may convey this information to the wireless terminal through a downlink control channel. The radio network node may then transmit data to the wireless terminal with the modulation and coding rate indicated in the downlink control channel. The radio network node may pre-multiply the data by a precoding vector/matrix before passing the data to the antennas.

The channel estimation for data demodulations differ in the two designs. In the common pilot only design, the wireless terminal may estimate the channels for data demodulation from the common pilot symbols. Note that in FIG. 3, the channel estimator on the Rx side receives only the common pilots as inputs. But in the common and demodulation pilot design, the demodulation pilots may also be used to estimate the channel for data demodulation. In FIG. 4, this is shown by the channel estimator receiving both the common and demodulation pilots as inputs. Since they are used in addition to the common pilots in the common and demodulation pilot design, the demodulation pilots are often referred to as "additional" pilots.

Figure 5:
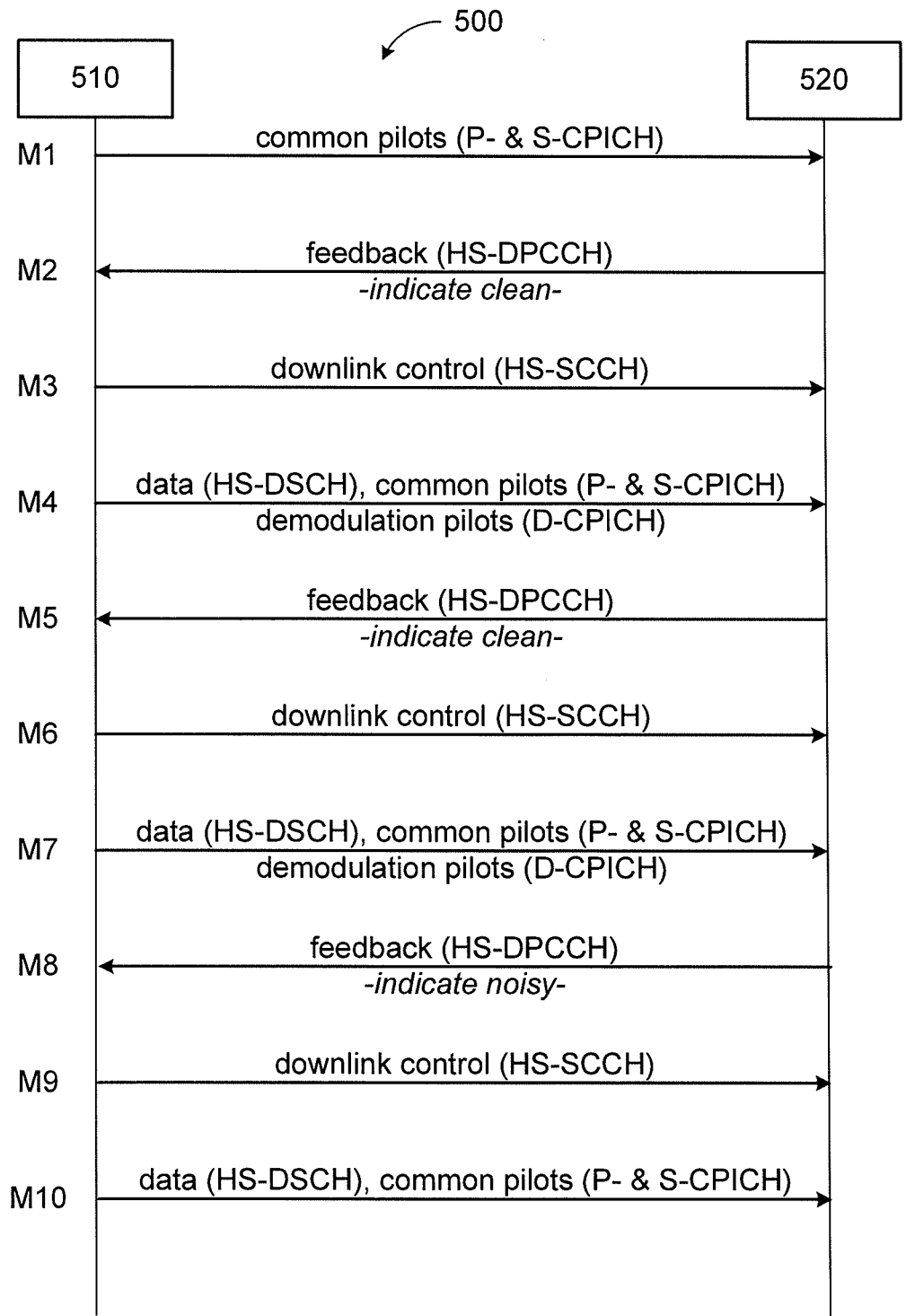
FIG. 5 illustrates an example of messages exchanged between a transmitting node and a receiving node.

In an aspect, a multi-antenna capable transmitting node may determine whether or not it is worthwhile to provide demodulation pilots to a receiving node. An example of messages M1-M10 exchanged between two nodes—a transmitting node 510 and a receiving node 520—of a multi-antenna wireless network 500 is illustrated in FIG. 5. In the downlink, the transmitting node 510 may be a radio network node (e.g., radio base station (RBS), eNB, eNodeB, NodeB, relay station, micro/femto/pico base station, etc.) and the receiving node 520 may be a wireless terminal (e.g., mobile terminal, UE, etc.). Again, the direction of communication should not be taken as a limitation.

In one scenario, the messages may be exchanged between a radio network node (e.g., eNodeB) as the transmitting node 510 and a wireless terminal (e.g., a UE) as the receiving node 520 during a typical call set up. The radio network node 510 may transmit a plurality of common pilots to the wireless terminal 520 (M1). In an embodiment, the radio network node 510 may transmit common pilot symbols on common pilot channels (e.g., P-CPICH, S-CPICH).

From the common pilot symbols, the wireless terminal 520 may estimate the channel and compute the CSI such as the channel quality, precoding channel indicator, and so on. The wireless terminal 520 may report the CSI along with hybrid ARQ ACK/NAK to the radio network node 510 (M2). In an embodiment, the feedback may be provided on a feedback channel. For example, once the wireless terminal 520 decides about the RI (rank indication) and the corresponding PCI, the information may be sent to the radio network node 510 via the feedback channel (e.g., HS-DPCCH). The periodicity of HS-DPCCH is typically one subframe (2 msec).

Upon receiving the feedback information, the radio network node 510 may decide the rank, modulation, transport block size, and the PCI for the data traffic. This information may be conveyed to the wireless terminal 520. In an embodiment, the control information may be included in a configuration message sent over a downlink control channel (e.g., HS-SCCH) (M3). The configuration message transmitted on the control channel may include scheduling information which specifies the downlink resources (any combination of time, frequency, code of data traffic channel (e.g., HS-PDSCH)) that are reserved for the wireless terminal 520. The configuration message may serve to notify the wireless terminal 520-explicitly or implicitly—that it should monitor both the common and demodulation pilots for data demodulation or monitor the common pilots only. In this particular example, it is assumed the radio network node 510 has determined that both should be monitored.

After transmitting the configuration message, the radio network node 510 may transmit data to the wireless terminal 520 on the data traffic channel during a data transmission time scheduled for the wireless terminal 520 (M4). During the data transmission time, the radio network node 510 may also transmit the demodulation pilots when it is determined that the demodulation pilots should be provided along with the common pilots. Note that the timing of the demodulation pilot transmission need not strictly coincide with the data transmission time. It is only necessary that demodulation pilots are present for at least some portion of the data transmission time sufficient for monitoring by the wireless terminal 520.

The process can repeat. For example as seen, the wireless terminal 520 may again estimate the channel based on the common pilots received in M4 and provide the feedback in M5. The feedback may be based on the common pilots only. Alternatively, since the demodulation pilots were also available, the wireless terminal 520 may estimate the channel based on the demodulation pilots in addition to the common pilots when providing the feedback to the radio network node 510. If the feedback in M5 indicates that the wireless terminal 520 remains in a clean environment, the transmitting node 510 may so notify the wireless terminal 520 in M6 and provide both the common and demodulation pilots in M7. However, if during the next iteration the feedback in M8 indicates that the wireless terminal 520 is now in a relatively dirty environment (e.g., the wireless terminal 520 may have physically moved, other terminals may have relocated in proximity to the wireless terminal 520, etc.), the transmitting node 510 may only provide the common pilots for the next data transmission (M9 and M10).

In an aspect, the radio network node 510 may always transmit the common pilots (M1, M4, M7, M10). For example in LTE, implementing 4×4 MIMO, the eNodeB may transmit four common pilots, one from each antenna. The $1^{st}$ and $2^{nd}$ common pilots (e.g., P-CPICH and $1^{st}$ S-CPICH, also respectively referred to as the primary and $1^{st}$ secondary common pilots) may be transmitted at relatively high powers from the first and second antennas respectively (e.g., −10 dB and −13 dB). The $1^{st}$ and $2^{nd}$ common pilots may be understood by both legacy receiving nodes as well as non-legacy receiving nodes. Since these are known to the legacy receiving nodes, they may also be referred to as legacy common pilots.

The $3^{rd}$ and $4^{th}$ common pilots (e.g., $2^{nd}$ and $3^{rd}$ S-CPICH, referred to as the $2^{nd}$ and $3^{rd}$ secondary common pilots) may be transmitted from the third and fourth antennas at relatively low powers (e.g., −22 dB). These low power common pilots may be understood by the non-legacy receiving nodes but not by the legacy receiving nodes. Hence, such signals may also be referred to as non-legacy common pilots.

Generally, the transmitting node 510 may transmit a plurality of common pilots including one or more legacy common pilots and one or more non-legacy common pilots. Each legacy common pilot may be transmitted at a higher power than each of the non-legacy common pilots. Each legacy common pilot may be known to both legacy and non-legacy receiving nodes. However, each non-legacy common pilot may be known to the non-legacy receiving nodes, but unknown to the legacy receiving nodes.

As indicated above, the $3^{rd}$ and $4^{th}$ (non-legacy) common pilots may be transmitted at relatively low powers since these signals are not useful to the legacy receiving nodes. Indeed, they may act as interferences. Thus, when legacy terminals are scheduled to receive data from the transmitting node 510, the interfering effects of the non-legacy common pilots are minimized by the low powers.

However, as explained with respect to FIGS. 1 and 2, when a non-legacy terminal is scheduled to receive data, in certain circumstances such as when the non-legacy terminal is scheduled to receive high data rate and/or high rank, the low power of the non-legacy common pilots can actually be disadvantageous.

But in an aspect of the disclosed subject matter, this problem is addressed through the demodulation pilots. As exemplified in FIG. 5, the transmitting node 510 may provide demodulation pilots for data demodulation when the geometry of the receiving node 520 is relatively high. The demodulation pilots can be in addition to the common pilots. On the other hand, when the geometry is relatively low, the transmitting node 510 may provide the common pilots only.

There can be any number of demodulation pilots. However, it is preferred that there be at least as many demodulation pilots as there are non-legacy common pilots. It is also preferred that the demodulation pilots be transmitted from the same antennas used to transmit the non-legacy common pilots.

One rationale is as follows. In one aspect, the common pilots transmitted by the transmitting node 510 for data demodulation are the same common pilots that the transmitting node 510 transmits for channel sounding purposes. That is, the transmitting node 510 can transmit the common pilots for use by the wireless terminal 520 to estimate the CSI of the channels between the transmitting node 510 and the wireless terminal 520. Some (i.e., one or more) of the common pilots are transmitted with lower power and some are transmitted with higher power. In one sense, the higher power common pilots correspond to pilots of legacy terminals (e.g., $1^{st}$ and $2^{nd}$ common pilots known to both the non-legacy and legacy UEs) and lower power common pilots correspond to pilots of newer terminals (e.g., $3^{rd}$ and $4^{th}$ common pilots are known to the non-legacy UEs but unknown to the legacy UEs).

Recall from the discussion above that the legacy UEs are negatively impacted by high $3^{rd}$ and $4^{th}$ pilot powers. Also recall from that in relatively dirty environments (at low geometries), performance improvements gained by the non-legacy UEs through high $3^{rd}$ and $4^{th}$ pilot powers are at best minimal. In FIGS. 1 and 2 for example, if the geometry G is 0 dB, there is no significant increase in throughput of the 4Tx UE when the $3^{rd}$ and $4^{th}$ pilot powers are increased from −25 dB to −13 dB. Thus, at low geometries, the benefit of improved performance from the non-legacy UEs will not be worth the cost of negatively impacting the legacy UEs. This implies that no additional pilot power should be expended, i.e., the $3^{rd}$ and $4^{th}$ pilot powers should remain low when the UE is in a noisy environment.

On the other hand, if the UE's environment is relatively clean (at high geometries), the gain in performance from the non-legacy UE through high $3^{rd}$ and $4^{th}$ pilot powers for data demodulation may be of greater value than the negative impact to the legacy UEs. Hence, when the non-legacy UE is in a clean environment, the $3^{rd}$ and $4^{th}$ pilot powers should be increased.

In an aspect, this can be achieved by transmitting the demodulation pilots on the same antennas used to transmit the lower power non-legacy common pilots. For example, by respectively transmitting $1^{st}$ and $2^{nd}$ demodulation pilots on the third and fourth antennas used to transmit the $3^{rd}$ and $4^{th}$ common pilots, the pilot powers of these antennas are effectively increased. Preferably, the power of each demodulation pilot is such that in combination with the non-legacy common pilot, the resulting pilot power of the antenna is sufficiently high to allow the wireless terminal 520 to make an accurate channel estimation for data demodulation, and thereby increase performance. To state it another way, the resulting pilot power should be at or greater than a pilot power threshold.

The pilot power threshold may be fixed or varied as circumstances dictate. For example, recall that with respect to FIGS. 1 and 2, if the geometry is at 20 dB, significantly higher throughput can be obtained by increasing the $3^{rd}$ and $4^{th}$ pilot powers from −25 dB to −13 dB. Thus, in one embodiment, the pilot power threshold may be set at −13 dB. In another embodiment, the pilot power threshold may be set to be equal to a power of one of the legacy common pilots.

It can be concluded that when transmitting data from a multi-antenna transmission capable transmitting node 510 to a multi-antenna reception capable receiving node 520, the transmitting node 510 should be capable of determining when to transmit the demodulation pilots and when to withhold them.

Figure 6:
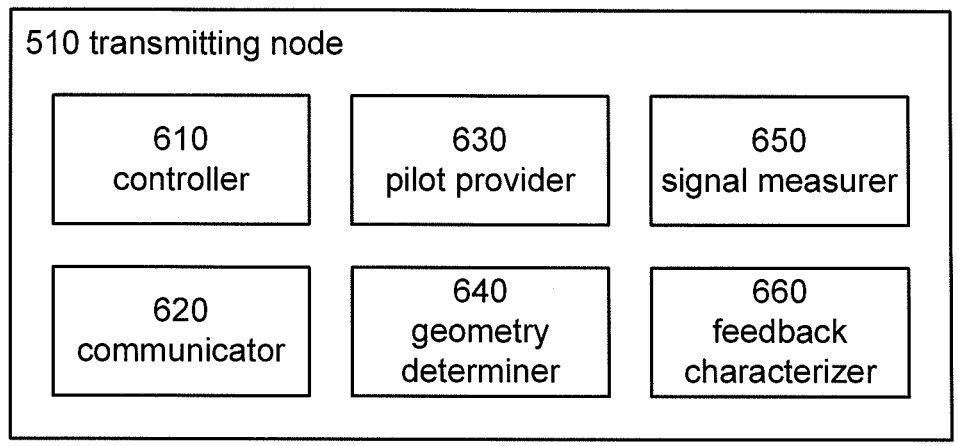
FIGS. 6 and 7 illustrate embodiments of a transmitting node of a wireless network structured to perform multi-antenna transmissions.

FIG. 6 illustrates an embodiment of a multi-antenna transmission capable transmitting node 510 structured to make such advantageous decisions. An example of the transmitting node 510 is a radio network node. The transmitting node 510 may comprise several devices including a controller 610, a communicator 620, a pilot provider 630, a geometry determiner 640, a signal measurer 650, and a feedback characterizer 660.

The communicator 620 may be structured to communicate with other nodes including the receiving node 520 such as the wireless terminal, RNC and with core network nodes. The pilot provider 630 may be structured to provide common and/or demodulation pilots. The geometry determiner 640 may be structured to determine the geometries of receiving nodes 520. The geometry determiner may work in conjunction with the signal measurer 650 and/or the feedback characterizer 660 to determine the geometries. The signal measurer 650 may be structured to measure signals transmitted from the receiving nodes 520 such as uplink signals from the wireless terminals. The feedback characterizer 660 may be structured to receive and characterize the feedback information provided from the receiving node 520. The controller 610 may be structured to control the overall operations of the transmitting node 510. Detailed features of the transmitting node 510 devices will be included in the description of the method illustrated in FIG. 8 provided further below.

FIG. 6 provides a logical view of the transmitting node 610 and the devices included therein. It is not strictly necessary that each device be physically separate from other devices. Some or all devices may be combined in one physical module. Conversely, at least one device may be divided into physically separate modules.

Figure 7:
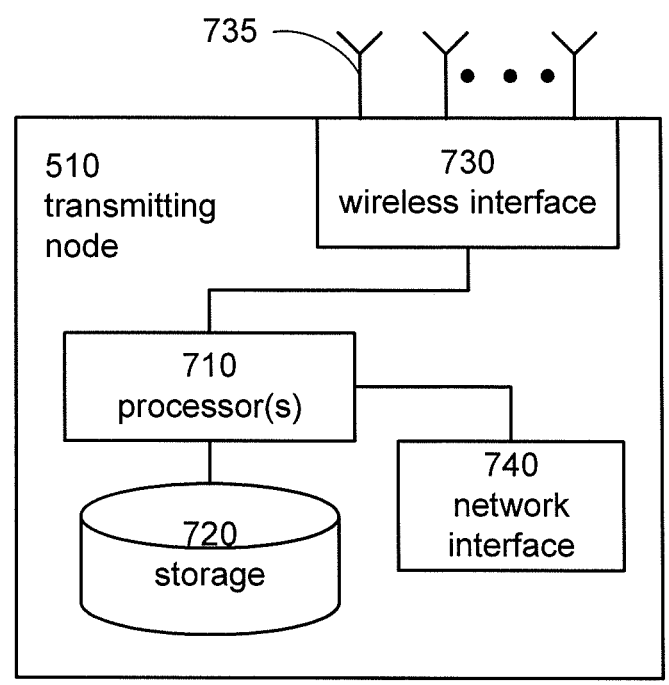

The devices of the transmitting node 510 need not be implemented strictly in hardware. It is envisioned that the devices can be implemented through any combination of hardware and software. For example, as illustrated in FIG. 7, the transmitting node 510 may include one or more processors 710, one or more storage 720, and one or both of a wireless interface 730 and a network interface 740. The processor(s) 710 may be structured to execute program instructions to perform the operations of one or more of the transmitting node devices. The instructions may be stored in a non-transitory storage medium or in firmware (e.g., ROM, RAM, Flash). Note that the program instructions may also be received through wired and/or or wireless transitory medium via one or both of the wireless and network interfaces 730, 740. The wireless interface 730 (e.g., a transceiver) may be structured to receive signals from and send signals to other radio network nodes via one or more antennas 735, which may be internal or external. The network interface 740 may be included and structured to communicate with other radio and/or core network nodes.

Figure 8:
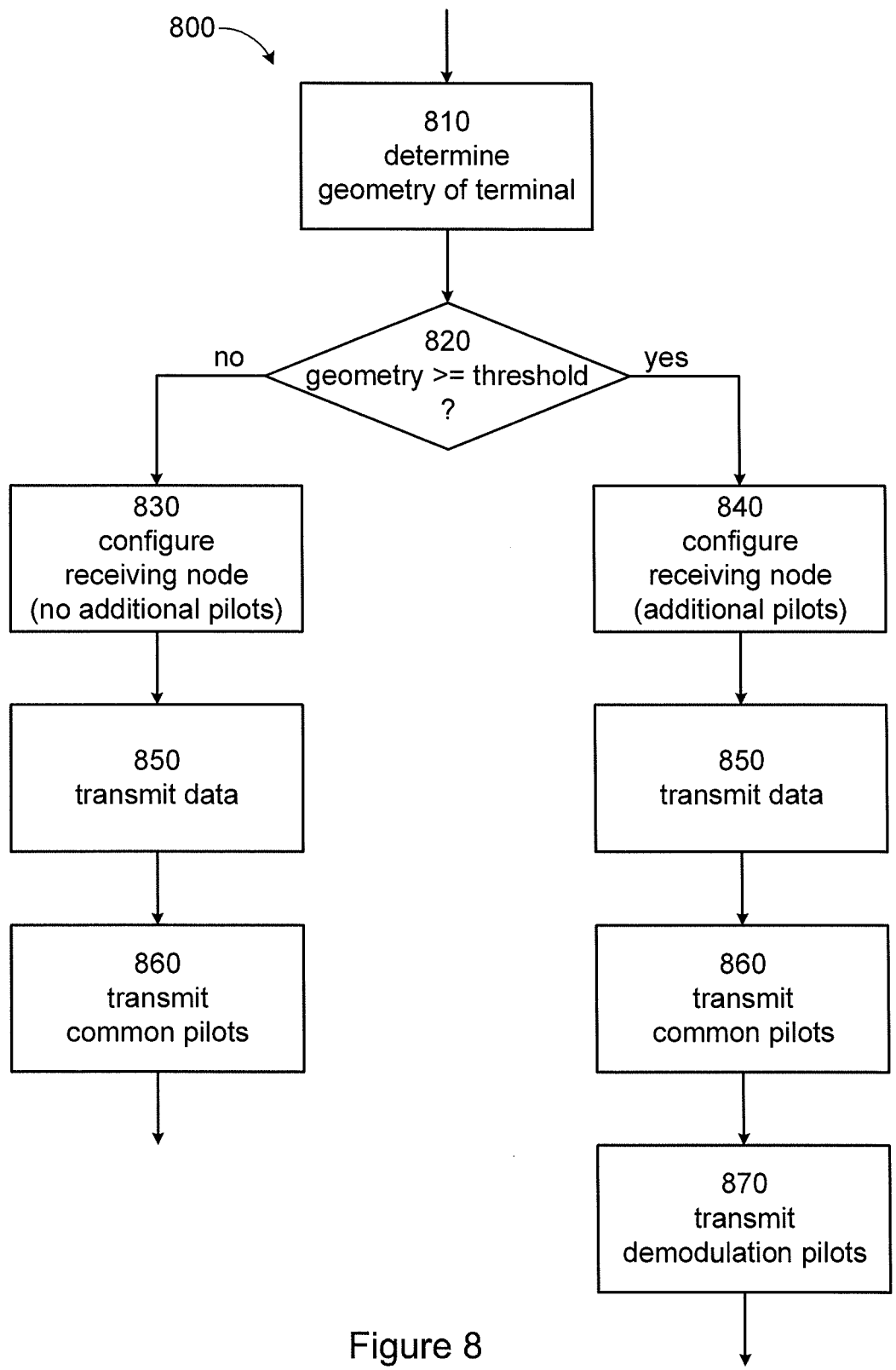
FIG. 8 is a flow chart illustrating an example method performed by a transmitting node for multi-antenna transmissions.

FIG. 8 is a flow chart illustrating an example method 800 of the transmitting node 510 to perform a multi-antenna transmission in accordance with one or more of the proposed approaches. As seen, the geometry determiner 640 may determine a geometry G of the receiving node 520 in step 810. From a perspective, the geometry G can be viewed as an indication of a quality of a signaling environment of the wireless terminal. In one aspect, geometry may be viewed as an indication of relative levels of desired signal(s) to undesired signal(s). The geometry G can be represented by any combination of parameters such SNR, SINR, CIR, BER, FER, and so on that indicate qualities of connections.

For discussion purposes, higher geometry will be assumed to indicate a cleaner environment (e.g., high SNR, SINR, inverse of BER, and so on). As such, the geometry will correlate with the level of desired signals and inversely correlate with the level of undesired signals. As an illustration, the geometry G of a receiving node 520 will generally correlate inversely with a distance of the receiving node 520 from the transmitting node 510 since the received (desired) signal power generally attenuates with distance. For example, a wireless terminal near a center of a cell (center being defined as the location of the radio network node) will experience a high geometry. Conversely, a wireless terminal near an edge of the cell will experience a low geometry. As another illustration, the geometry of a receiving node 520 will generally correlate inversely with a number of other radio nodes in the cell and/or in proximity to the receiving node 520 since this will tend to increase the level of interfering (undesired) signals. But of course, geometry can be defined such that lower values indicate a cleaner environment.

Figure 9:
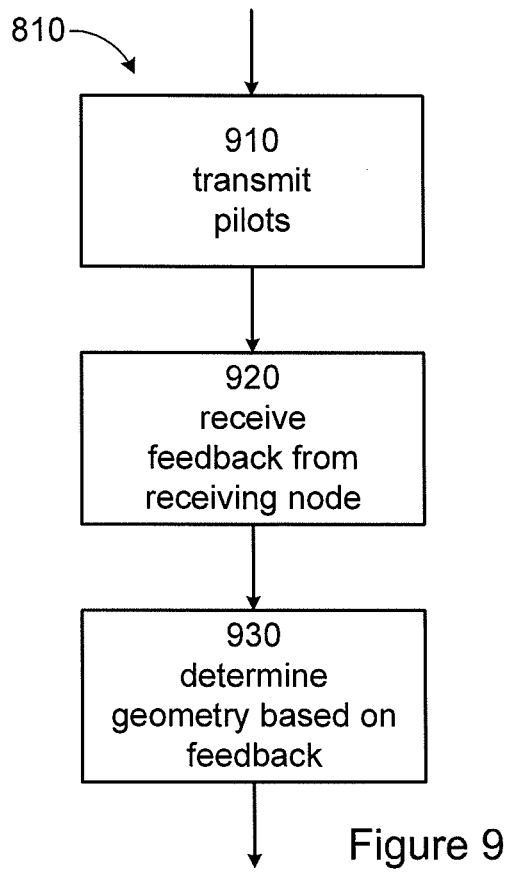
FIGS. 9 and 10 are flow charts illustrating example processes performed by a transmitting node to determine a geometry of a receiving node.

Step 810 may be accomplished in multiple ways. FIG. 9 is a flow chart illustrating an example process that the transmitting node 510 may perform to determine the geometry G of the receiving node 520. In step 910, the pilot provider 630 may transmit pilot signals to the receiving node 520. In some instances, the pilot signals may include a plurality of common pilot signals only. In other instances, the pilot signals may also include one or more demodulation pilot signals in addition to common pilot signals. Further details of the pilot signals will be provided below in the discussions of steps 860 and 870 of FIG. 8.

In step 920, the feedback characterizer 660 may receive a feedback from the receiving node 520. In an embodiment, the feedback may be received over a feedback channel. An example of the feedback channel is the HS-DPCCH. The receiving node 520 may provide the feedback based at least on the common pilot signals transmitted from the transmitting node 510 (e.g., see M2, M5 and M8 in FIG. 5). The feedback may be based on the demodulation pilot signals as well (e.g., see M5 and M8 in FIG. 5). The feedback may include the CSI of the communication channel between the transmitting node 510 and the receiving node 520. Such information may include any one or more of SNR, SINR, CIR, CQI, BER, FER, a preferred coding matrix, a preferred rank, a preferred coding rate, PCI, among others. The feedback may also include the location of the receiving node 520.

In step 930, the geometry determiner 640 may determine the geometry G of the receiving node 520 based on the feedback. The value of G may be determined based on a single parameter in the feedback or a combination of parameters. The parameters may be weighted. If the feedback includes the location, then the location may also factor in the geometry determination. For example, whether the receiving node 520 is near the cell center or near the cell edge may be taken into consideration. The geometry G may be determined based on the single feedback. But in another embodiment, the geometry G may be determined based on multiple feedbacks from the receiving node 520. For example, it may be that good CSI estimations should be reported over a period of time (e.g., high CQI for some number of TTIs) before concluding that the geometry of the receiving node 520 is high.

Figure 10:
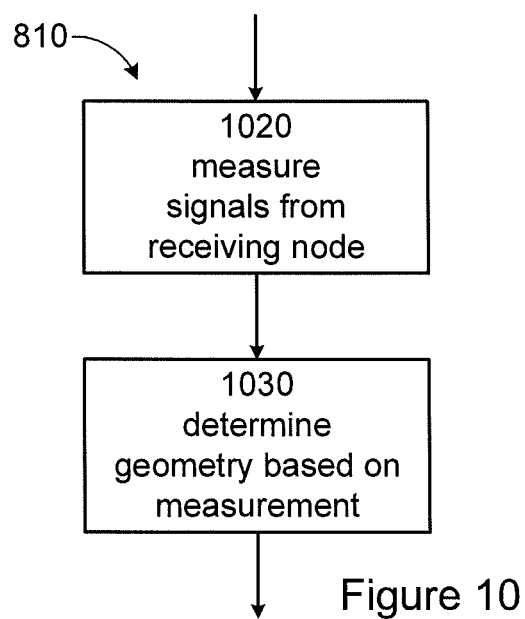

Another way to accomplish step 810 is shown in FIG. 10, which is a flow chart illustrating another example process that the transmitting node 510 may perform to determine the geometry of the receiving node 520. In step 1020, the signal measurer 650 may measure a signal transmitted by the receiving node 520. Preferably, the signal is a signal whose transmission strength at the receiving node 520 is known to the transmitting node 510. For example, when the transmitting node 510 is radio network node and the receiving node 520 is a wireless terminal, the radio network node may measure the uplink signals transmitted from the wireless terminal. An example of such uplink signal is a pilot or reference signal the wireless terminal transmits. Being a reference signal, the radio network node should be aware of how strong the wireless terminal transmits the pilot signal. In another example, the strength of transmission of an uplink signal may be specified by the transmitting node 510, for example, through TPC commands.

In step 1030, the geometry determiner 640 may determine the geometry of the receiving node 520 based on the measurement. For example, by comparing the received strength and the transmit strength of the uplink signal, the radio network node can determine the geometry. The geometry G may be determined based on a single measurement. But in another embodiment, the geometry may be determined based on multiple measurements made over time.

It should be noted that FIGS. 9 and 10 are not exclusive to each other. In other words, the transmitting node 510 may determine the geometry G of the receiving node 520 (perform step 810) based on feedback alone (single or multiple feedbacks over time) as in FIG. 9, based on measurements alone (single or multiple measurements over time), or based on a combination of both. These are not necessarily the only ways of determining the geometry G. Other ways to determine the quality of the signaling environment of the receiving node 520 may qualify.

Referring back to FIG. 8, after determining the geometry G of the receiving node 520, the geometry determiner 640 may determine whether or not the geometry G of the receiving node 520 is at or above a geometry threshold G_t in step 820. If the geometry is below the geometry threshold (i.e., if G<G_t), the receiving node 520 may be assumed to be in a relatively dirty environment. Conversely, if the geometry is at or above the geometry threshold (i.e., if G≥G_t), the receiving node 520 may be assumed to be in a relatively clean environment. It should be noted that the geometry threshold G_t may be fixed or configured. For example, the threshold G_t value can be raised/lowered as the number of legacy UEs increase/decrease. In another example, threshold G_t value can be raised/lowered as the quality of service (QoS) requirement is increased/decreased.

Regardless of whether the receiving node's environment is dirty or clean, the communicator 620 may send a configuration message to the receiving node 520 in either step 830 or 840. The configuration message may be sent over a control channel. The control channel may be a downlink control channel such as HS-SCCH. The configuration message may include parameters such as rank, modulation, transport block size, PCI and so on.

Even though the mechanism of sending the configuration message may be similar (e.g., configuration message sent over the control channel), the configuration message itself may differ depending on the receiving node's environment. If the geometry determiner 640 determines that the receiving node 520 is in a relatively dirty environment (e.g., G<G_t) in step 820, the configuration message sent in step 830 may serve to notify the receiving node 520 to monitor the common pilot signals only for data demodulation. On the other hand, if the geometry determiner 640 determines that the receiving node 520 is in a relatively clean environment (e.g., G≥G_t) in step 820, the configuration message sent in step 840 may serve to notify the receiving node 520 to monitor the demodulation pilot signals in addition to the common pilot signals.

The notification may be explicit. For example, the configuration message may include a first flag which when set indicates that the transmitting node 510 will transmit common pilot signals only, and a second flag which when set indicates that the transmitting node 510 will transmit both common and demodulation pilot signals. The notification may be implicit. For example, based on the parameters such as rank and modulation included in the configuration message, the receiving node 520 may monitor the common pilot signals only or monitor both common and demodulation pilot signals. In another example, the transmitting node 510 may always transmit the common pilot signals, and the configuration message may include a demodulation flag to indicate whether the transmitting node 510 will transmit the demodulation pilot signals. In this instance, the state of the demodulation flag (set or reset) will indicate to the receiving node 520 whether or not it should monitor the demodulation pilot signals in addition to the common pilot signals.

After sending the configuration message in either step 830 or 840, the communicator 620 may transmit data to the receiving node 520 in step 850. The data may be transmitted during a data transmission time scheduled for the receiving node 520.

The pilot provider 630 may transmit a plurality of common pilot signals in step 860. In one embodiment, each common pilot signal may be transmitted from one antenna 735 of the transmitting node 510. Preferably, no antenna is used to transmit more than one common pilot signal. The plurality of common pilot signals may include one or more legacy common pilot signals and one or more non-legacy common pilot signals. In this context, a legacy common pilot signal may be viewed as a common pilot signal that is known to both legacy and non-legacy receiving nodes. A non-legacy common pilot signal may be viewed as a common pilot signal that is known to the non-legacy receiving nodes, but unknown to the legacy receiving nodes. In one embodiment, the pilot provider 630 may transmit each legacy common pilot signal at a higher power than each of the non-legacy common pilot signal.

It should be noted it is not necessary for step 850 (transmitting data) to complete before commencing step 860 (transmitting the common pilot signals). That is, steps 850 and 860 may be performed concurrently. For example, step 860 may commence while step 850 is being performed. Alternatively, step 850 may commence while step 860 is being performed. Yet further, both steps may be simultaneously commenced.

If the geometry determiner 640 determines that the receiving node's environment is relatively clean in step 820, then in addition to transmitting the common pilot signals in step 860, the pilot provider 630 may transmit one or more demodulation pilot signals in step 870. Preferably, each demodulation pilot signal is transmitted using one antenna 735, and that no antenna is used to transmit more than one demodulation pilot signal. The demodulation pilot signals may be specifically precoded for the receiving node 520. But this is not a requirement. That is, the demodulation pilot signals may be made available to the whole cell, i.e., not specifically precoded for any particular receiving node 520.

Preferably, each demodulation pilot signal should be transmitted from a same antenna used to transmit one of the non-legacy common pilot signals. Also preferably, the power of the demodulation pilot signal should be sufficient to bring the pilot power of that antenna to a lever at or above the pilot power threshold. The pilot provider 630 may transmit the demodulation pilots during the data transmission time. As noted, the timing of the demodulation pilot transmission need not strictly coincide with the data transmission time. It may be sufficient to ensure that the demodulation pilots are present for at least some portion of the data transmission time.

In one specific implementation example, there may be four common pilot signals—a primary common pilot signal and $1^{st}$, $2^{nd}$ and $3^{rd}$ secondary common pilot signals. Then in step 860, the pilot provider 630 may transmit the primary common pilot signal from a first antenna 735 of the transmitting node 510 and transmit the $1^{st}$, $2^{nd}$ and $3^{rd}$ secondary common pilot signals respectively from second, third and fourth antennas 735 of the transmitting node 510.

The primary and the $1^{st}$ secondary common pilot signals may be known to the legacy and non-legacy receiving nodes 520 (legacy common pilot signals). Thus, the pilot provider 630 may transmit the primary and the $1^{st}$ secondary common pilot signals with relatively high powers in step 860. For example, one or both of the primary and the $1^{st}$ secondary common pilot signals may be transmitted with power levels at or above the pilot power threshold.

However, the $2^{nd}$ and $3^{rd}$ secondary common pilot signals may be known only to the non-legacy receiving nodes (non-legacy common pilot signals). Thus, the pilot provider 630 may transmit the $2^{nd}$ and $3^{rd}$ secondary common pilot signals at relatively low powers in step 860. For example, one or both of the $2^{nd}$ and $3^{rd}$ secondary common pilot signals may be transmitted with power levels below the pilot power threshold.

Assuming that the receiving node's environment is clean, in step 870, the pilot provider 630 may also transmit $1^{st}$ and $2^{nd}$ demodulation pilot signals from the third and fourth antennas, which are the antennas used to transmit the relatively low power $2^{nd}$ and $3^{rd}$ secondary common pilot signals. Preferably, the powers of the $1^{st}$ and $2^{nd}$ demodulation pilot signals are such that the pilot powers transmitted from the third and fourth antennas are at or above the pilot power threshold.

Note that in a cell corresponding to a radio network node, there can be any number of wireless terminals being served by that radio network node. In this scenario, if the scheduled resources to the wireless terminals differ in time (i.e., services to the terminals are time multiplexed), the method 800 may be performed individually for each wireless terminal.

However, the scheduled resources to two or more terminals may differ in code and/or frequency but not in time. That is, multiple terminals may be concurrently scheduled. In another scenario, the scheduled resources to multiple terminals may be separated in time. However, the granularity of a scheduling block may span a time duration (e.g., some number of TTIs) such that if transmission resources for multiple terminals are scheduled within the scheduling block, they may be considered to be "concurrently" scheduled.

Figure 11:
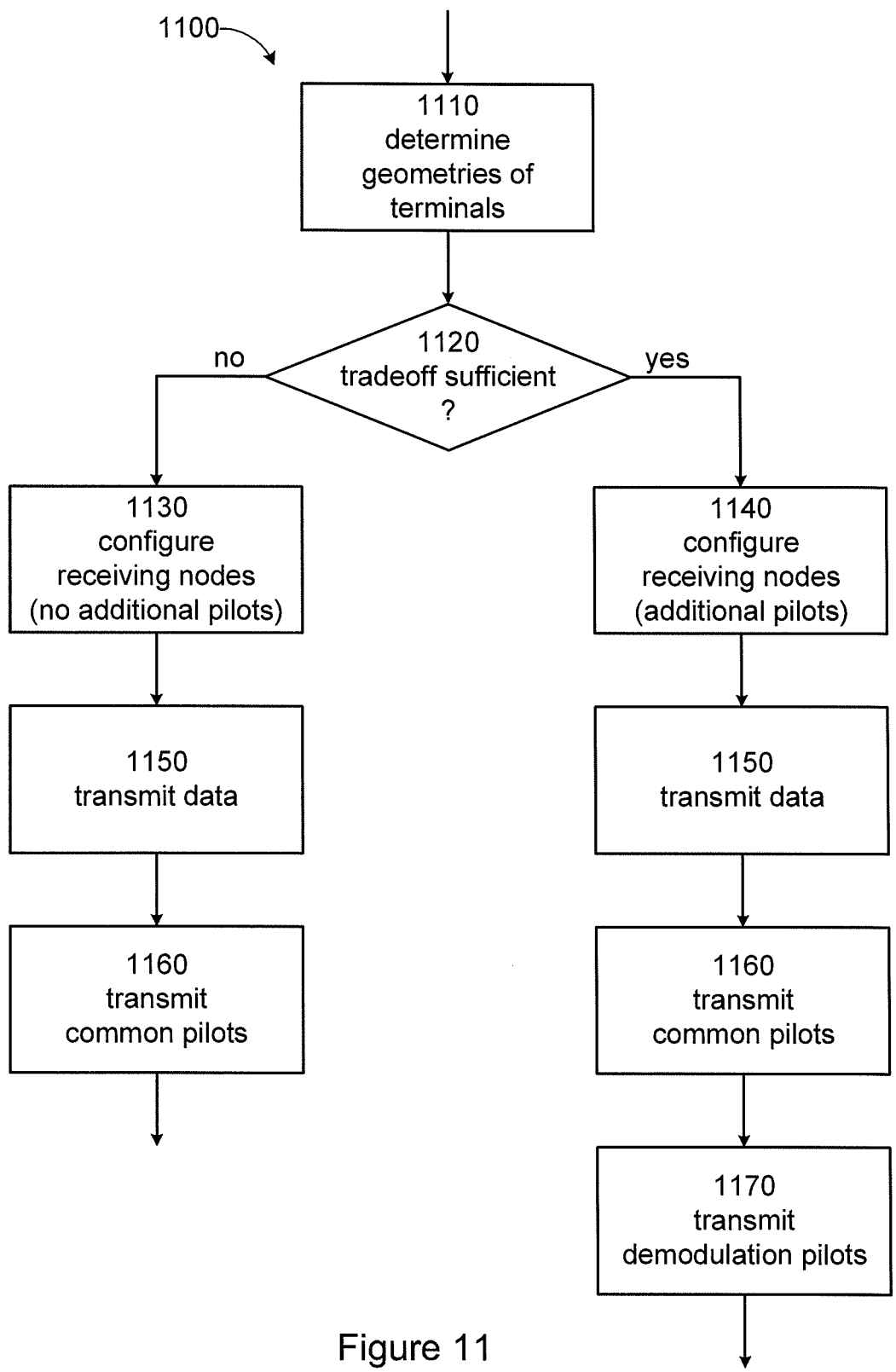
FIG. 11 is a flow chart illustrating an example method performed by a transmitting node for multi-antenna transmissions to multiple receiving nodes.

FIG. 11 is a flow chart illustrating an example method 1100 of the transmitting node 510 to perform multi-antenna transmissions to multiple receiving nodes 520. As seen, the geometry determiner 640 may determine the geometry G(i) for each of the multiple receiving nodes 520 in step 1110. In one embodiment, the geometry determiner 640 may perform one or both of the processes illustrated in FIGS. 9 and 10 for each receiving node 520. The same process need not be used for all receiving terminals 520. For example, geometry for one receiving node 520 may be determined through feedback, another may be determined through measurements, and yet another may be determined through a combination.

Based on the geometries G(i), the geometry determiner 640 may determine whether or not the expected tradeoff is sufficient to warrant transmitting the demodulation pilot signals for data demodulation in step 1120. There are multitudes of ways this tradeoff can be determined. The following are just some of the ways:

A number of geometries at or above G_t is greater than a predetermined number;
A number of geometries at or above G_t is greater than a number of geometries below G_t;

A ratio of number of geometries at or above G_t to number of geometries below G_t is greater than a predetermined ratio;

Expected performance increase is greater than expected negative impact.

Regardless of whether the geometry determiner 640 determines that the tradeoff is worth while or not, the communicator 620 may send configuration messages over the control channel to the receiving nodes 520 in either step 1130 or 1140. The configuration message may include similar parameters (rank, modulation, transport block size, PCI and so on) as in step 830 or 840. However, if the geometry determiner 640 determines that the tradeoff is not worthwhile in step 1120, the configuration message sent in step 1130 may notify the receiving nodes 520 that only the common pilot signals need be monitored. Conversely, if the geometry determiner 640 determines that the tradeoff is worthwhile in step 1120, the configuration message sent in step 1140 may notify the receiving nodes 520 that the demodulation pilot signals should be monitored as well. Again, the notifications can be explicit or implicit.

The configuration messages may be individualized. For example, to accomplish step 1130 (or 1140), the communicator 620 may perform step 830 (or 840) for each receiving node 520. Alternatively, the configuration message maybe common. For example, to also accomplish step 1130 (or 1140), the communicator 620 may precode the configuration message with a common code understandable by each receiving node 520. Alternatively, the configuration message may be made available to the cell.

After sending the configuration message or messages, the communicator 620 may transmit the data to the receiving nodes 520 in step 1150 at their respective data transmission times. Also, the pilot provider 630 may transmit the plurality of common pilot signals in step 1160. If the geometry determiner 640 determines that the tradeoff is worthwhile in step 1120, the pilot provider 630 in step 1170 may transmit one or more demodulation pilot signals addition to the common pilot signals. These steps may be similar to steps 850, 860 and 870 and thus will not be described in further detail in the interest of brevity.

There are many advantages associated with one or more aspects of the disclosed subject matter. A non-exhaustive list of advantages include:

Minimize adverse impact of non-legacy common pilot signals on legacy receiving nodes; and Improve performance of non-legacy receiving nodes by providing higher power pilots when necessary.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments, and that the scope is accordingly not to be limited. All structural and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed by a transmitting node of a wireless communication system, the transmitting node being capable of multi-antenna transmission, the method comprising:

transmitting data to a receiving node;

transmitting a plurality of common pilot signals to the receiving node, wherein the plurality of common pilot signals includes a first set of one or more common pilot signals and a second set of one or more common pilot signals, and wherein each common pilot signal in the first set of common pilot signals is transmitted at a lower power compared to each common pilot signal in the second set of common pilot signals; and transmitting one or more demodulation pilot signals to the receiving node, wherein in the step of transmitting the plurality of common pilot signals to the receiving node, each common pilot signal is transmitted from one antenna of the transmitting node, and no antenna is used to transmit more than one common pilot signal, and wherein in the step of transmitting the one or more demodulation pilot signals to the receiving node, each demodulation pilot signal is transmitted from a same antenna used to transmit one of the first set of one or more common pilot signals, which is transmitted at the lower power compared to each common pilot signal in the second set of one or more common pilot signals, and no antenna is used to transmit more than one demodulation pilot signal.

2. The method of claim 1, further comprising:

determining a geometry of the receiving node; and determining whether the receiving node's geometry is at or above a geometry threshold, wherein in the step of transmitting the one or more demodulation pilot signals to the receiving node, the one or more demodulation pilot signals are transmitted based on determining that the geometry of the receiving node is at or above the geometry threshold.

3. The method of claim 2, wherein the step of determining the geometry of the receiving node comprises:

receiving a feedback from the receiving node over a feedback channel, the feedback being based on the common pilot signals transmitted from the transmitting node, and the feedback including a channel state information of a communication channel between the transmitting node and the receiving node; and determining the geometry of the receiving node based on the feedback.

4. The method of claim 2, wherein the step of determining the geometry of the receiving node comprises:

measuring an uplink signal transmitted from the receiving node, a transmission strength of the uplink signal at the receiving node being known to the transmitting node; and determining the geometry of the receiving node based on the measurement of the uplink signal.

5. The method of claim 2, further comprising:

sending a configuration message to the receiving node over a downlink control channel based on determining that the geometry of the receiving node is at or above the geometry threshold, wherein the configuration message notifies the receiving node to monitor the common and the demodulation pilot signals.

6. The method of claim 1, wherein in the step of transmitting the data to the receiving node, the data is transmitted during a data transmission time scheduled for the receiving node, and wherein in the step of transmitting the one or more demodulation pilot signals to the receiving node, each demodulation pilot signal is also transmitted during the data transmission time.

7. The method of claim 1,
wherein the second set of one or more common pilot signals includes one or more legacy common pilot signals, and the first set of one or more common pilot signals includes one or more non-legacy common pilot signals,
wherein each legacy common pilot signal is known to both non legacy and legacy receiving nodes, and
wherein each non-legacy common pilot signal is known to non legacy receiving nodes and unknown to the legacy receiving nodes.

8. The method of claim 1,
wherein the plurality of common pilot signals comprise a primary common pilot signal, and secondary common pilot signals, and the step of transmitting the plurality of common pilot signals comprises transmitting the primary common pilot signal from a first antenna of the transmitting node and transmitting the secondary common pilot signals respectively from second, third and fourth antennas of the transmitting node, and
wherein the one or more demodulation pilot signals comprise 1st and 2nd demodulation pilot signals, and the step of transmitting the one or more demodulation pilot signals comprises transmitting the 1st and 2nd demodulation pilot signals respectively from the third and fourth antennas of the transmitting node.

9. The method of claim 1, wherein each demodulation pilot signal is not specifically precoded for the receiving node.

10. A non-transitory computer readable medium carrying a computer program that when executed by a computer of a transmitting node causes the computer to perform the method of claim 1.

11. The method of claim 1, wherein:
the plurality of common pilot signals includes a first common pilot signal, a second common pilot signal, a third common pilot signal, and a fourth common pilot signal,
the first set of one or more common pilot signals includes the third common pilot signal and the fourth common pilot signal,
the second set of one or more common pilot signals includes the first common pilot signal and the second common pilot signal,
the one or more demodulation pilot signals include a first demodulation pilot signal and a second demodulation pilot signal, and
the first and second demodulation pilot signals are transmitted from the same antennas used to transmit the third and fourth common pilot signals.

12. The method of claim 11, wherein the first common pilot signal and the second common pilot signal are pilot signals that the receiving node is able to use, and the third common pilot signal and the fourth common pilot signal, which shares antennas with the first demodulation pilot signal and the second demodulation pilot signal, cannot be used by the receiving node.

13. A transmitting node of a wireless communication system, the transmitting node configured to be capable of multi-antenna transmission, the transmitting node comprising:
a communicator configured to transmit data to a receiving node; and
a pilot provider configured to
transmit a plurality of common pilot signals that includes a first set of one or more common pilot signals and a second set of one or more common pilot signals, such that each common pilot signal is transmitted from one antenna of the transmitting node, and no antenna is used to transmit more than one common pilot signal, and wherein each common pilot signal in the first set of one or more common pilot signals is transmitted at a lower power compared to each common pilot signal in the second set of one or more common pilot signals, and
transmit one or more demodulation pilot signals to the receiving node such that each demodulation pilot signal is transmitted from a same antenna used to transmit one of the first set of one or more common pilot signals, which is transmitted at the lower power compared to each common pilot signal in the second set of one or more common pilot signals, and no antenna is used to transmit more than one demodulation pilot signal.

14. The transmitting node of claim 13, further comprising:
a geometry determiner configured to:
determine a geometry of a receiving node, and
determine whether the receiving node's geometry is at or above a geometry threshold,
wherein the pilot provider is structured to transmit the one or more demodulation pilot signals based on determining that the geometry of the receiving node is at or above the geometry threshold.

15. The transmitting node of claim 14, further comprising:
a feedback characterizer configured to receive a feedback from the receiving node over a feedback channel, the feedback being based on the common pilot signals transmitted from the transmitting node, and the feedback including a channel state information of a communication channel between the transmitting node and the receiving node,
wherein the geometry determiner is configured to determine the geometry of the receiving node based on the feedback.

16. The transmitting node of claim 14, further comprising:
a signal measurer configured to measure an uplink signal transmitted from the receiving node, a transmission strength of the uplink signal at the receiving node being known to the transmitting node,
wherein the geometry determiner is configured to determine the geometry of the receiving node based on the measurement of the uplink signal.

17. The transmitting node of claim 14,
wherein the communicator is configured to send a configuration message to the receiving node over a downlink control channel based on the geometry determiner determining that the geometry of the receiving node is at or above the geometry threshold, and
wherein the configuration message notifies the receiving node to monitor the common and the demodulation pilot signals.

18. The transmitting node of claim 13,
wherein the communicator is configured to transmit the data during a data transmission time scheduled for the receiving node, and
wherein the pilot provider is configured to transmit each demodulation pilot signal also during the data transmission time.

19. The transmitting node of claim 13,
wherein the second set of one or more common pilot signals includes one or more legacy common pilot signals, and the first set of one or more common pilot signals includes one or more non-legacy common pilot signals,
wherein each legacy common pilot signal is known to both non legacy and legacy receiving nodes, and
wherein each non-legacy common pilot signal is known to the non legacy receiving nodes and unknown to the legacy receiving nodes.

20. The transmitting node of claim 13,
wherein the plurality of common pilot signals comprise a primary common pilot signal, and secondary common pilot signals, and the pilot provider is configured to transmit the primary common pilot signal from a first antenna of the transmitting node and transmit the secondary common pilot signals respectively from second, third and fourth antennas of the transmitting node, and
wherein the one or more demodulation pilot signals comprise 1st and 2nd demodulation pilot signals, and the pilot provider is configured to transmit the 1st and 2nd demodulation pilot signals respectively from the third and fourth antennas of the transmitting node.

21. The transmitting node of claim 13, wherein each demodulation pilot signal is not specifically precoded for the receiving node.

* * * * *